(12) United States Patent
Hagio et al.

(10) Patent No.: US 11,219,879 B2
(45) Date of Patent: Jan. 11, 2022

(54) ALUMINOPHOSPHATE-METAL OXIDE BONDED BODY AND PRODUCTION METHOD FOR SAME

(71) Applicant: NGK Insulators, Ltd., Nagoya (JP)

(72) Inventors: Takeshi Hagio, Nagoya (JP); Makoto Miyahara, Nagoya (JP); Tetsuya Uchikawa, Nagoya (JP); Makiko Ichikawa, Nagoya (JP); Kenichi Noda, Nagoya (JP); Kenji Yajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 231 days.

(21) Appl. No.: 14/867,127

(22) Filed: Sep. 28, 2015

(65) Prior Publication Data

US 2016/0016146 A1     Jan. 21, 2016

Related U.S. Application Data

(63) Continuation of application No. PCT/JP2014/058512, filed on Mar. 26, 2014.

(30) Foreign Application Priority Data

Mar. 29, 2013 (JP) .............................. JP2013-074511

(51) Int. Cl.
*B01J 20/06* (2006.01)
*B01D 69/12* (2006.01)
(Continued)

(52) U.S. Cl.
CPC ............ *B01J 20/06* (2013.01); *B01D 63/066* (2013.01); *B01D 67/0051* (2013.01);
(Continued)

(58) Field of Classification Search
None
See application file for complete search history.

(56) References Cited

U.S. PATENT DOCUMENTS 4,171,288 A * 10/1979 Keith ................... B01J 23/6567
502/304
4,310,440 A    1/1982 Wilson et al.
(Continued)

FOREIGN PATENT DOCUMENTS

CN     101850203 A    10/2010
JP     57-077015 A1    5/1982
(Continued)

OTHER PUBLICATIONS

Simmen et al. Zeolites, 1991, vol. 11, p. 654-661.*
(Continued)

*Primary Examiner* — Humera N. Sheikh
*Assistant Examiner* — Elizabeth D Ivey
(74) *Attorney, Agent, or Firm* — Burr & Brown, PLLC

(57) ABSTRACT

An aluminophosphate-metal oxide bonded body including a metal oxide having a bonding surface on a part of the surface thereof, and aluminophosphate that is disposed on the bonding surface of the metal oxide, wherein an alkali metal, an alkaline earth metal or both of these is/are disposed on the bonding surface of the metal oxide, and the content rate of the alkali metal, alkaline earth metal or both is from 0.3 to 30.0% by mass with respect to all of the substances that are disposed on the bonding surface of the metal oxide. An aluminophosphate-metal oxide bonded body that provides a favorable bonded state even for complicated shapes is provided.

18 Claims, 2 Drawing Sheets

(51) Int. Cl.
    *B01D 71/02*     (2006.01)
    *B01D 67/00*     (2006.01)
    *B01J 20/30*     (2006.01)
    *C01B 37/04*     (2006.01)
    *C04B 35/63*     (2006.01)
    *B01D 63/06*     (2006.01)
    *C04B 38/00*     (2006.01)
    *C04B 35/447*     (2006.01)
    *B01J 20/28*     (2006.01)
    *C01B 39/54*     (2006.01)
    *C04B 111/00*     (2006.01)

(52) U.S. Cl.
    CPC ........... *B01D 69/12* (2013.01); *B01D 71/022* (2013.01); *B01D 71/028* (2013.01); *B01J 20/28042* (2013.01); *B01J 20/3078* (2013.01); *C04B 35/447* (2013.01); *C04B 35/6309* (2013.01); *C04B 35/6313* (2013.01); *C04B 38/0035* (2013.01); *B01D 2323/12* (2013.01); *C01B 37/04* (2013.01); *C01B 39/54* (2013.01); *C04B 2111/00801* (2013.01); *C04B 2235/3206* (2013.01); *C04B 2235/3208* (2013.01); *C04B 2235/3217* (2013.01); *C04B 2235/3232* (2013.01); *C04B 2235/3418* (2013.01); *C04B 2235/447* (2013.01); *C04B 2235/781* (2013.01); *Y02P 20/129* (2015.11)

(56) References Cited

U.S. PATENT DOCUMENTS

| | | | |
|---|---|---|---|
| 4,385,994 A | 5/1983 | Wilson et al. | |
| 4,898,660 A | 2/1990 | Wilson et al. | |
| 5,001,096 A * | 3/1991 | Chu | B01J 33/00 502/516 |
| 6,080,698 A * | 6/2000 | Zhang | B01J 29/40 502/64 |
| 6,177,373 B1 * | 1/2001 | Sterte | B01D 67/0051 502/4 |
| 6,355,093 B1 * | 3/2002 | Schwartz | B01D 53/228 210/500.25 |
| 2002/0016522 A1 * | 2/2002 | Vaughn | B01J 29/005 585/640 |
| 2002/0063082 A1 * | 5/2002 | Touvelle | B01J 23/468 208/134 |
| 2007/0243129 A1 * | 10/2007 | Bell | B01D 53/02 423/716 |
| 2010/0247851 A1 | 9/2010 | Miyata et al. | |
| 2011/0250127 A1 * | 10/2011 | Fedeyko | B01D 53/9418 423/700 |
| 2012/0110988 A1 | 5/2012 | Dotzel et al. | |
| 2012/0117952 A1 | 5/2012 | Dotzel et al. | |
| 2012/0117953 A1 | 5/2012 | Andersen et al. | |
| 2012/0121486 A1 | 5/2012 | Collier et al. | |
| 2012/0122660 A1 * | 5/2012 | Andersen | B01J 23/30 502/65 |
| 2012/0272826 A1 * | 11/2012 | Uchikawa | B01D 53/228 96/8 |
| 2014/0065042 A1 | 3/2014 | Andersen et al. | |
| 2014/0072490 A1 | 3/2014 | Dotzel et al. | |
| 2014/0241981 A1 * | 8/2014 | Dutta | B01D 67/0051 423/709 |

FOREIGN PATENT DOCUMENTS

| | | |
|---|---|---|
| JP | 07-089714 A1 | 4/1995 |
| JP | 2005-112656 A1 | 4/2005 |
| JP | 2013-059714 A1 | 4/2013 |
| WO | 2008/078779 A1 | 7/2008 |
| WO | 2011/092523 A1 | 8/2011 |

OTHER PUBLICATIONS

Conception et. al. Surface Sci. and Catalysis, 94, 1995, 681-688.*
Conception et. al. Topics in Catalysis 3, 1996, 451-460.*
Simmen et al. "The structure determination and rietveld refinement of the aluminophosphate AlPO4-18 Zeolites", vol. 11, Issue 7, Sep.-Oct. 1991, pp. 654-661 (Year: 1991).*
Simmen et al. "The structure determination and rietveld refinement of the aluminophosphate AlP04-18 Zeolites", vol. 11, Issue 7, Sep.-Oct. 1991, pp. 654-661. (Year: 1991).*
Characterization of AlPO4-type molecular sieving melnbranes formed on a porous a-alumina tube; Guoqing Guan, Takeshi Tanaka, Katsuki Kusakabe*,Ken-Ichiro Sotowa, Shigeharu Morooka; Journal of Membrru1e Science 214 (2003) 1 91-198 from IDS dated Oct. 7, 2015 (Year: 2003).*
English translation of International Preliminary Report on Patentability (Chapter I) (Application No. PCT/JP2014/058512) dated Sep. 29, 2015, 5 pages.
Extended European Search Report (Application No. 14775097.0) dated Oct. 27, 2016.
Maria L. Carreon, et al., "AlPO-18 Membranes for $CO_2$/$CH_4$ Separation†," Chem Communication, 2012, vol. 48, pp. 2310-2312.
Masahiko Matsukata, et al., "$AlPO_4$-18 Maku no Gosei Oyobi Toka Bunri Seino no Kento," Abstracts of Annual Meeting of the Society of Chemical Engineers, Japan, Feb. 15, 2012, vol. 77, p. 207.
Guoquin Guan, et al., "Characterization of $AlPO_4$-type Molecular Sieving Membranes Formed on a Porous α-Alumina Tube," Journal of membrane Science, 2003, vol. 214, pp. 191-198.
D.A. Lindquist, et al., "Supported Membranes of Aluminum Phosphate on Porous Alumina Substrates," Materials Research Society Symposium Proceedings, vol. 371, Advances in Porous Materials, Materials Research Society, 1995, pp. 345-350.
International Search Report and Written Opinion (Application No. PCT/JP2014/058512) dated Jul. 8, 2014.
Chinese Office Action, Chinese Application No. 201480019407.7, dated Jun. 7, 2016 (6 pages) with complete English translation (6 pages).

* cited by examiner

ALUMINOPHOSPHATE-METAL OXIDE BONDED BODY AND PRODUCTION METHOD FOR SAME

BACKGROUND OF THE INVENTION

1. Field of the Invention

The present invention relates to an aluminophosphate-metal oxide bonded body, and a method for producing the bonded body. More specifically, the present invention relates to an aluminophosphate-metal oxide bonded body that gives a favorable bonded state even for complicated shapes, and a method for producing an aluminophosphate-metal oxide bonded body by which such aluminophosphate-metal oxide bonded body can be prepared.

2. Description of Related Art

Aluminophosphate is a material that is expected to be used in separation membranes, refrigerant adsorption carriers for heat pumps, and the like. In the case when the aluminophosphate has a membrane shape, it is preferable to use the membrane in a state of a bonded body by bonding the membrane with a surface of a structure, from the viewpoints of ensuring of strength, and the like. In the case when a membrane or the like is bonded to a structure by this way, it is known to prepare by a secondary growth process, which is a method in which seed crystals adhered to a structure are grown to form a membrane on the surface of the structure (for example, see Non Patent Document 1). This method includes bonding an aluminophosphate membrane to an inner side of a tube made of stainless steel by rubbing seed crystals against the inside of the tube by a rubbing process, and then conducting hydrothermal synthesis. This method is a method in which seed crystals adhere to the surface of a structure by rubbing, and thus has a problem that, in the case when the structure has a complicated shape, it is difficult to sufficiently allow the seed crystals to adhere and thus it is difficult to make the bonded state favorable.

CITATION LIST

Non Patent Document

[Non Patent Document 1] Maria L. Carreon, Shiguang Li and Moises A. Carreon, Chem. Commun., 2012, 48, 2310-2312

SUMMARY OF THE INVENTION

Problem to be Solved by the Invention

In the invention described in Non Patent Document 1, as mentioned above, in the case when the structure has a complicated shape, it is difficult to make the bonded state favorable. Therefore, for example, in the case when aluminophosphate is to be bonded to an inner wall surface of a through hole of a structure having a monolithic shape, it is difficult to rub seed crystals against the inner wall surface of the long and thin through hole, and thus it is difficult to use the method described in Non Patent Document 1. Since aluminophosphate seed crystals have low adhesiveness, it is difficult to sufficiently allow the seed crystals to adhere to a structure having a complicated shape by only rubbing the seed crystals against the structure.

The present invention was made in view of such problem in the conventional technologies. The present invention provides an aluminophosphate-metal oxide bonded body that provides a favorable bonded state even for complicated shapes. Furthermore, the present invention provides a method for producing an aluminophosphate-metal oxide bonded body by which an aluminophosphate-metal oxide bonded body that provides a favorable bonded state even for complicated shapes can be prepared.

Means for Solving the Problem

According to the present invention, the aluminophosphate-metal oxide bonded bodies and the production methods therefor mentioned below are provided.

According to a first aspect of the present invention, an aluminophosphate-metal oxide bonded body including a metal oxide having a bonding surface on a part of the surface thereof is provided, and aluminophosphate that is disposed on the bonding surface of the metal oxide, wherein an alkali metal, an alkaline earth metal or both of these is/are disposed on the bonding surface of the metal oxide, and the content rate of the alkali metal, alkaline earth metal or both is from 0.3 to 30.0% by mass with respect to all of the substances that are disposed on the bonding surface of the metal oxide.

According to a second aspect of the present invention, the aluminophosphate-metal oxide bonded body according to the first aspect is provided, wherein the alkali metal is sodium, and the alkaline earth metal is calcium, magnesium or both of these.

According to third aspect of the present invention, the aluminophosphate-metal oxide bonded body according to the first or second aspects is provided, wherein the content rate of the alkali metal, alkaline earth metal or both of these is from 0.5 to 20.0% by mass with respect to all of the substances that are disposed on the bonding surface of the metal oxide.

According to a fourth aspect of the present invention, the aluminophosphate-metal oxide bonded body according to any one of the first to third aspects is provided, wherein the metal oxide contains at least one kind selected from the group consisting of alumina, titania and silica by 70% by mass or more in total.

According to a fifth aspect of the present invention, the aluminophosphate-metal oxide bonded body according to any one of to the first to fourth aspects is provided, wherein the metal oxide is a structural body having at least one inner space, and a value obtained by dividing the surface area of the bonding surface of the metal oxide by the space volume of the metal oxide is 100 or more.

According to a sixth aspect of the present invention, the aluminophosphate-metal oxide bonded body according to the fifth aspect is provided, wherein the inner space of the metal oxide is a space having at least one open end on the surface of the metal oxide, the length of the inner space in the direction to which the inner space extends is 100 mm or more, and the open end of the inner space has a diameter of 5 mm or less.

According to a seventh aspect of the present invention, the aluminophosphate-metal oxide bonded body according to the fifth or sixth aspects is provided, wherein the inner space is a through hole having open ends on both end parts, the metal oxide has a monolithic shape having 10 or more of the through holes, and the through holes each has a cross-sectional surface having a diameter of 5 mm or less and being orthogonal to the direction to which the through holes extend.

According to an eighth aspect of the present invention, the aluminophosphate-metal oxide bonded body according to any one of the first to seventh aspects is provided, wherein the aluminophosphate has, within a surface thereof that faces the surface of the metal oxide, a surface which is not bonded to the metal oxide and whose surface area ratio is 1% or less.

According to a ninth aspect of the present invention, the aluminophosphate-metal oxide bonded body according to any one of the first to eighth aspects is provided, wherein the aluminophosphate has a molecular structure being a structure having an oxygen 8-membered ring.

According to a tenth aspect of the present invention, the aluminophosphate-metal oxide bonded body according to any one of the first to ninth aspects is provided, wherein the aluminophosphate has an AEI structure.

According to an eleventh aspect of the present invention, the method for producing aluminophosphate-metal oxide bonded body is provided, including; a step of allowing a seed crystal to adhere, wherein a seeding slurry containing aluminophosphate seed crystals is applied to a bonding surface, which is a part of a surface of a metal oxide, and a synthesis step, wherein the metal oxide on which the seeding slurry has been applied is immersed in a raw material solution for membrane formation containing an aluminum source raw material, a structure directing agent and phosphorus acid and subjected to hydrothermal synthesis, whereby aluminophosphate is disposed on the bonding surface of the metal oxide to give an aluminophosphate-metal oxide bonded body, wherein an alkali metal, an alkaline earth metal or both of these is/are disposed on the bonding surface of the metal oxide, and the content rate of the alkali metal, alkaline earth metal or both of these is from 0.3 to 30.0% by mass with respect to all of the substances disposed on the bonding surface of the metal oxide.

According to a twelfth aspect of the present invention, the method for producing an aluminophosphate-metal oxide bonded body according to the eleventh aspect is provided, wherein the liquid phase of the seeding slurry, in which the aluminophosphate seed crystals are dispersed, is water, ethanol or a mixture thereof.

According to a thirteenth aspect of the present invention, the method for producing an aluminophosphate-metal oxide bonded body according to the eleventh or twelfth aspects is provided, wherein the concentration of the aluminophosphate seed crystals in the seeding slurry is from 0.01 to 1.00% by mass.

According to a fourteenth aspect of the present invention, the method for producing an aluminophosphate-metal oxide bonded body according to any one of the eleventh to thirteenth aspects is provided, wherein the aluminophosphate seed crystals contain a structure directing agent.

According to a fifteenth aspect of the present invention, the method for producing an aluminophosphate-metal oxide bonded body according to any one of the eleventh to fourteenth aspects is provided, wherein the aluminophosphate seed crystals have an average particle diameter of from 80 to 500 nm, the metal oxide is porous and has pores that are opened on the bonding surface of the metal oxide, wherein each pore has an open pore diameter of from 0.3 to 1.5-times of the average particle diameter of the aluminophosphate seed crystals.

According to a sixteenth aspect of the present invention, the method for producing an aluminophosphate-metal oxide bonded body according to any one of the eleventh to fifteenth aspects is provided, wherein the temperature condition in the hydrothermal synthesis is from 130 to 170° C.

According to a seventeenth aspect of the present invention, the method for producing an aluminophosphate-metal oxide bonded body according to any one of the eleventh to sixteenth aspects is provided, wherein the time for the hydrothermal synthesis is from 10 to 50 hours.

Effect of the Invention

The aluminophosphate-metal oxide bonded body of the present invention is a bonded body of aluminophosphate and a metal oxide, in which only a predetermined amount of "an alkali metal, an alkaline earth metal or both of these" is disposed on the bonding surface of the metal oxide. Therefore, "the alkali metal, alkaline earth metal or both of these" disposed on the bonding surface of the metal oxide plays a role to strongly bond the aluminophosphate and the metal oxide. Accordingly, an aluminophosphate-metal oxide bonded body that gives a favorable bonded state even for complicated shapes is formed.

DETAILED DESCRIPTION OF THE INVENTION

Figure 1:
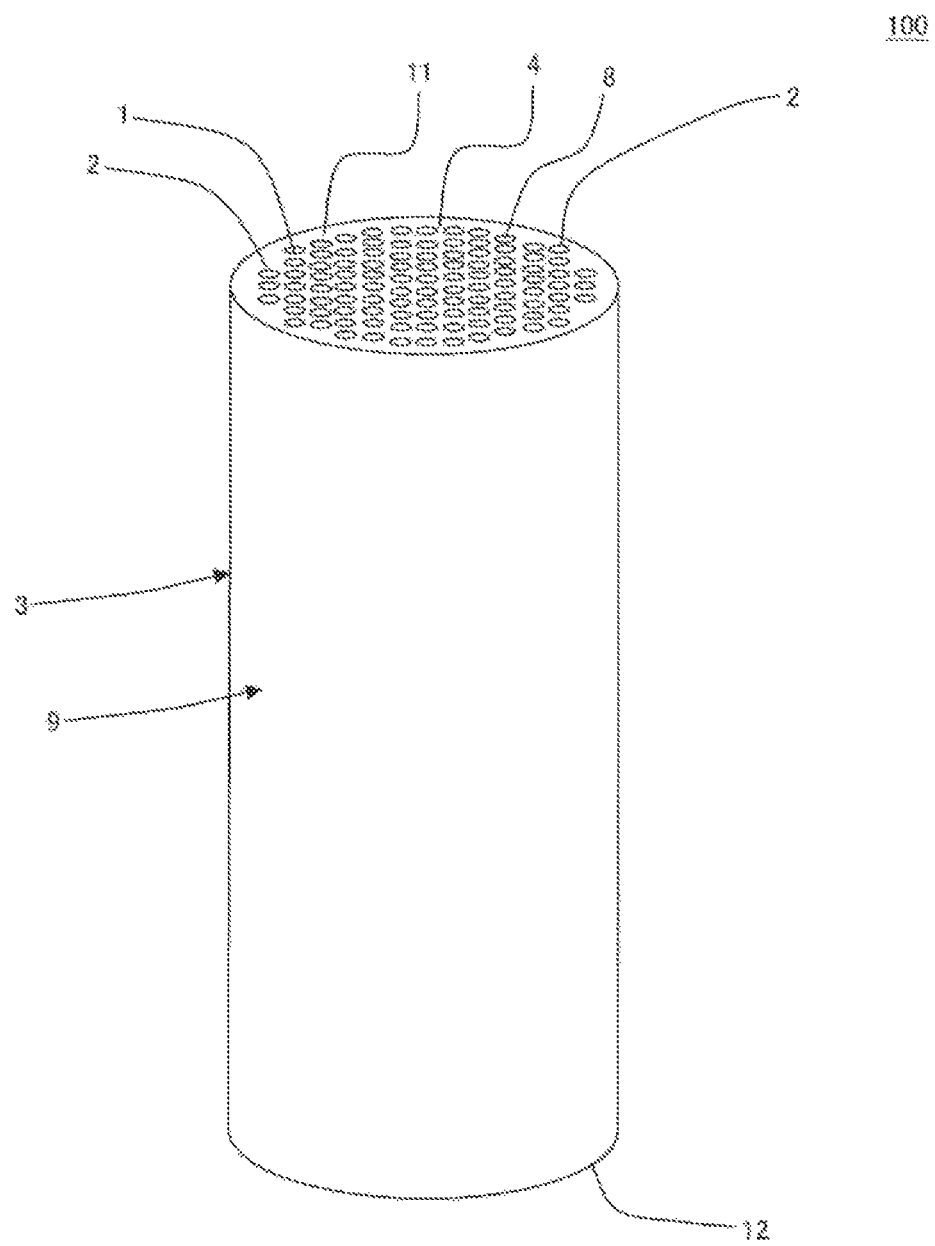
FIG. 1 is a perspective view that schematically shows an exemplary embodiment of the aluminophosphate-metal oxide bonded body of the present invention.

The embodiments for carrying out the present invention will be specifically explained below with referring to the drawings. It should be understood that the present invention is not limited to the following embodiments, and the design thereof is suitably modified, improved or the like based on the general knowledge of a person skilled in the art within the scope that does not deviate from the purport of the present invention.

Figure 2:
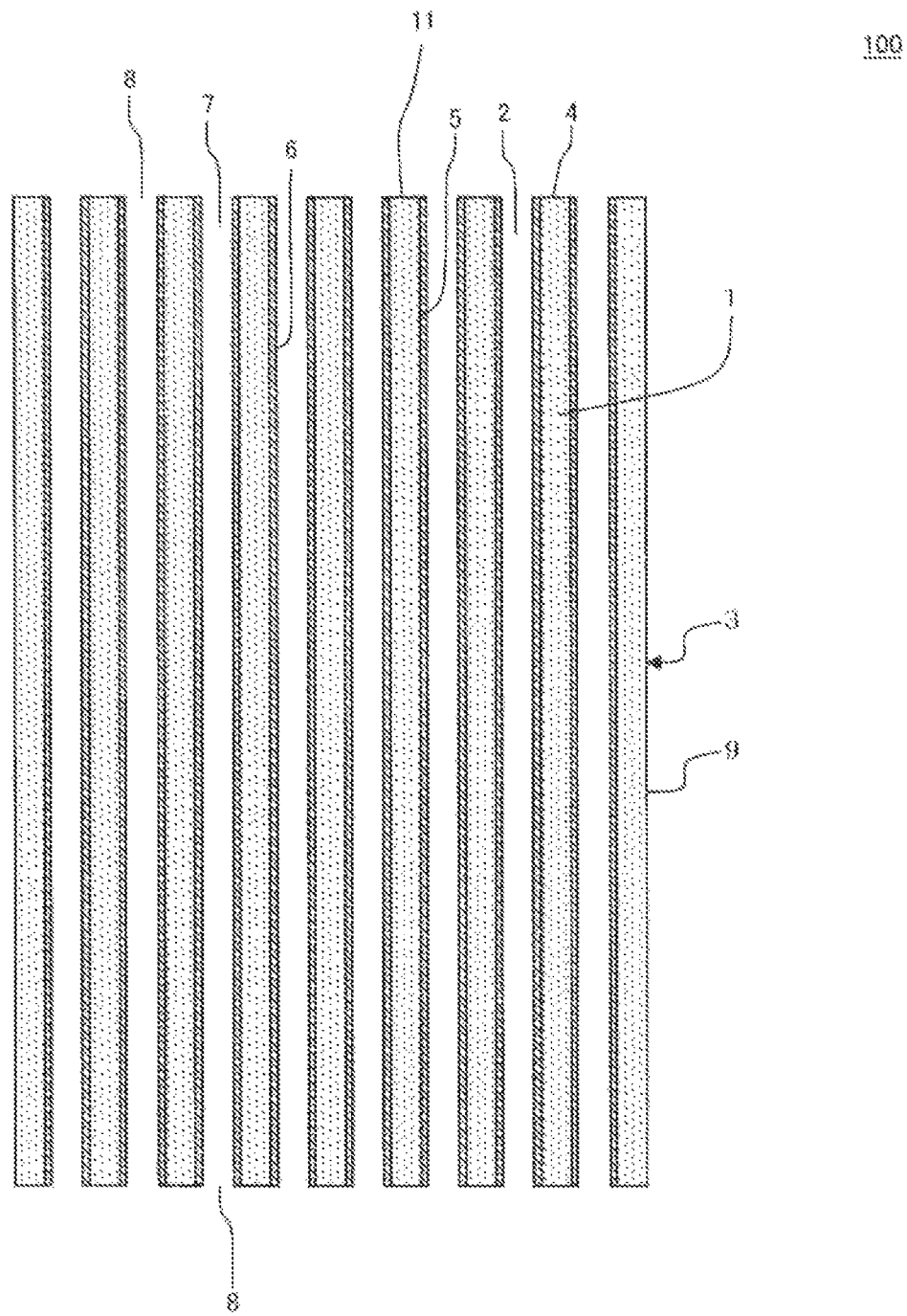
FIG. 2 is a schematic view that shows a cross-sectional surface that is in parallel with the direction to which the through holes extend in an exemplary embodiment of the aluminophosphate-metal oxide bonded body of the present invention.

(1) Aluminophosphate-Metal Oxide Bonded Body:

As shown in FIGS. 1 and 2, an exemplary embodiment of the aluminophosphate-metal oxide bonded body of the present invention includes a metal oxide 3 having a bonding surface 5 on a part of a surface 4, and aluminophosphate 6 that is disposed on the bonding surface 5 of the metal oxide 3. Furthermore, "an alkali metal, an alkaline earth metal or both of these" is disposed on the bonding surface 5 of the metal oxide 3. Furthermore, the content rate of the alkali metal, alkaline earth metal or both of these is from 0.3 to 30.0% by mass with respect to all of the substances disposed on the bonding surface 5 of the metal oxide 3. The content rate of each of the alkali metal and alkaline earth metal contained in the metal oxide is a value measured by the following method. Firstly, a sample in which the cross-sectional surface of the bonded interface between the aluminophosphate and metal oxide can be observed is cut out. Furthermore, the content rates of the alkali metal and alkaline earth metal at three portions in "an area within a thickness of 1 μm from the bonding surface 5" of the metal oxide are measured by a scanning electron microscope equipped with an energy dispersion X-ray analyzer (SEM-EDS). Furthermore, the obtained values at the three portions are averaged, and deemed as the content rates of the alkali metal and alkaline earth metal.

Since the aluminophosphate-metal oxide bonded body of the present exemplary embodiment has such constitution, "the alkali metal, alkaline earth metal or both of these" disposed on the bonding surface of the metal oxide plays a role to strongly bond the aluminophosphate and metal oxide. Therefore, an aluminophosphate-metal oxide bonded body that gives a favorable bonded state even for complicated shapes is formed.

The aluminophosphate-metal oxide bonded body of this exemplary embodiment includes the metal oxide 3 having the bonding surface 5 on a part of the surface 4, and the aluminophosphate ($AlPO_4$-n) 6 disposed on the bonding surface 5 of the metal oxide 3. It is preferable that the aluminophosphate has a molecular structure that is a structure having an oxygen 8-membered ring. Furthermore, it is preferable that the aluminophosphate has an AEI structure. The aluminophosphate has a crystal structure having pores in a crystal and acts as a molecular sieve, and thus can be used as a separation membrane, an adsorbent material, an adsorbent material for a heat exchanger body or the like. Furthermore, the aluminophosphate can also be used as a low dielectric material or a protective membrane. Furthermore, the aluminophosphate is preferably such that pores that extend (are directed) in "three directions" that are orthogonal to one another (x-direction, y-direction and z-direction) are formed therein. It is especially preferable that the aluminophosphate is $AlPO_4$-18.

The aluminophosphate preferably has a membrane shape, but may have a plate shape or other shape. In the case when the aluminophosphate has a membrane shape, the thickness of the membrane is preferably from 0.5 to 5 μm, further preferably from 0.5 to 3 μm, and especially preferably from 0.5 to 2 μm. If the thickness is thinner than 0.5 μm, functions as a molecular sieve are difficult to be exerted, and for example, when the membrane is used as a separation membrane, the separation performance may decrease. If the thickness is thicker than 5 μm, molecules are difficult to be permeated, and thus when the membrane is used as a separation membrane, the treatment amount may decrease, and defects may occur in a step for removing a structure directing agent.

The metal oxide 3 is a structural body having the bonding surface 5 on a part of the surface 4. It is preferable that the metal oxide 3 contains at least one kind selected from the group consisting of alumina, titania and silica by 70% by mass or more in total. The metal oxide 3 contains at least one kind selected from the group consisting of alumina, titania and silica, further preferably by 80% by mass or more in total, and especially preferably by 90% by mass or more in total. "The at least one kind selected from the group consisting of alumina, titania and silica to be contained in the metal oxide 3" mentioned above is referred to as "specific oxide". The content rate of the specific oxide contained in the metal oxide 3 is a value measured by the following method. Specifically, the content rates of the specific oxide at three portions on the cross-sectional surface of the metal oxide 3 are measured by a scanning electron microscope equipped with an energy dispersion X-ray analyzer (SEM-EDS). Furthermore, the obtained values at the three portions are averaged and deemed as the content rate of the specific oxide. Furthermore, the metal oxide 3 may be such that "the alkali metal, alkaline earth metal or both of these" is contained throughout the metal oxide. Furthermore, the metal oxide 3 may be such that "the surface layer in which the surface thereof is the bonding surface 5" contains "the alkali metal, alkaline earth metal or both of these". Furthermore, "the surface layer in which the surface thereof is the bonding surface 5" mentioned above may be a layer that is bound to the metal oxide by firing, or may be a layer that has adhered to the surface of the metal oxide. "The layer that has adhered to the surface of the metal oxide" refers to a layer formed by only applying a raw material slurry on the surface of the metal oxide and drying the raw material slurry without binding by sintering on the surface of the metal oxide. The metal oxide is preferably a porous body. The porosity and average pore diameter of the metal oxide can be suitably determined according to use.

The metal oxide 3 is preferably a structural body having at least one inner space 7. A value obtained by dividing the surface area of the bonding surface 5 of the metal oxide 3 with the space volume of the metal oxide 3 is preferably 100 or more, further preferably 300 or more, and especially preferably from 400 to 2,000. The space volume of the metal oxide 3 is a value obtained by adding the volume of the metal oxide and the volume of the inner space. When the value obtained by dividing the surface area of the bonding surface 5 of the metal oxide 3 by the space volume of the metal oxide 3 is lower than 100, the amount of the aluminophosphate to be disposed on the aluminophosphate-metal oxide bonded body decreases. Therefore, the amount may become insufficient as an amount for exerting "a function as a molecular sieve" and the like of the aluminophosphate.

The inner space 7 of the metal oxide 3 is preferably a space having at least one open end 8 on the surface 4 of the metal oxide 3. The inner space 7 has a length in "the direction to which the inner space 7 extends" of preferably 100 mm or more, more preferably from 150 to 2,000 mm, and especially preferably from 500 to 2,000 mm. In the case when the length in "the direction to which the inner space 7 extends" of the inner space 7 is 100 mm or more, the present invention exerts a higher effect. If the length is lower than 100 mm, a sufficient bonding surface may not be obtained. Furthermore, the open end 8 of the inner space 7 has a diameter of preferably from 5 mm or less, more preferably from 1 to 4 min, especially preferably from 1 to 2.5 mm. When the diameter of the open end 8 of the inner space 7 is 5 mm or less, the present invention exerts a higher effect. If the diameter exceeds 5 mm, a sufficient bonding surface may not be obtained.

The inner space 7 is preferably the through hole 2 having the open ends 8 and 8 on the both end parts. Furthermore, it is preferable that the metal oxide 3 has a monolithic shape having 10 or more of the through holes 2. Furthermore, the number of the through holes 2 in the metal oxide 3 is further preferably 50 or more, especially preferably 1,000 or more. The monolithic shape is a shape having porous partition walls 1 that define and form a plurality of through holes 2 that extend from one end face 11 to another end face 12 and serve as flow paths for a fluid, and a circumferential wall 9 that is positioned on the outermost circumference. The diameter of "the cross-sectional surface that is orthogonal to the direction to which the inner space extends" of each through hole 2 is preferably 5 mm or less, further preferably from 1 to 4 mm, especially preferably from 1 to 2.5 mm. When the diameter of "the cross-sectional surface that is orthogonal to the direction to which the inner space extends" of the through hole 2 is 5 mm or less, the present invention exerts a higher effect. If the diameter exceeds 5 mm, a sufficient bonding surface may not be obtained. In the case when the metal oxide 3 has a monolithic shape, it is preferable that the inner wall surface of the through hole is a bonding surface.

In the aluminophosphate-metal oxide bonded body of this exemplary embodiment, as mentioned above, "the alkali metal, alkaline earth metal or both of these" is disposed on the bonding surface 5 of the metal oxide 3. Furthermore, the content rate of "the alkali metal, alkaline earth metal or both of these" is from 0.3 to 30.0% by mass, further preferably from 0.5 to 20% by mass, especially preferably from 2 to 10% by mass with respect to all of the substances disposed on the bonding surface 5 of the metal oxide 3. If the content rate is less than 0.3% by mass, it may be difficult to make the bonded state between the aluminophosphate and metal oxide favorable. If the content rate is more than 30.0% by mass, the bonding strength may decrease. That "the bonded state is favorable" herein means that the aluminophosphate has, within a surface thereof that faces the surface of the metal oxide, a surface which is not bonded to the metal oxide and whose surface area ratio is 1% or less. That "disposed on the bonding surface" herein means being present "in the range from the bonding surface to a depth of 1 µm". Furthermore, the content rate (content) of the "substance that is disposed on the bonding surface (for example, an alkali metal or the like)" is the abundance ratio of this substance (for example, an alkali metal or the like) that is present in the above-mentioned "range from the bonding surface to a depth of 1 µm". "The content rate of the alkali metal, alkaline earth metal or both of these" is, for example, in the case when the bonding surface contains both of the alkali metal and the alkaline earth metal, the rate of "the total of the respective contents of the alkali metal and alkaline earth metal" to the overall bonding surface.

In the case when the alkali metal is disposed on the bonding surface 5 of the metal oxide 3, it is preferable that the alkali metal is sodium. Furthermore, in the case when the alkaline earth metal is disposed on the bonding surface 5 of the metal oxide 3, it is preferable that the alkaline earth metal is "calcium, magnesium or both of these". Furthermore, when the alkali metal and the alkaline earth metal are compared, the alkaline earth metal is more preferable.

In the aluminophosphate-metal oxide bonded body of this exemplary embodiment, the aluminophosphate preferably has, within a surface thereof that faces the surface of the metal oxide, a surface which is not bonded to the metal oxide and whose surface area ratio is 1% or less. In other words, it is preferable that the aluminophosphate-metal oxide bonded body has a favorable bonded state. Furthermore, the above-mentioned surface area ratio is further preferably 0.01% or less, especially preferably 0.001% or less. If the above-mentioned surface area ratio exceeds 1%, when the aluminophosphate is used in "a separation membrane for separating a fluid to be treated, or the like", the fluid to be treated which is ejected outside without being separated due to that the fluid does not pass the separation membrane increases, and thus the separation may become insufficient. In the case when the aluminophosphate is used in "the separation membrane for separating a fluid to be treated, or the like", it is preferable that the metal oxide is porous. The fluid to be treated, which has not passed the separation membrane, enters from "the surface that faces the aluminophosphate but is not bonded thereto" of the surface of the metal oxide into inside of the metal oxide, and then is ejected outside. Herein, "the surface facing the surface of the metal oxide of the aluminophosphate" is, for example, in the case when the aluminophosphate has a membrane shape, the surface that is directed toward the side of the surface of the metal oxide of the aluminophosphate membrane.

(2) Method for Producing Aluminophosphate-Metal Oxide Bonded Body:

An exemplary embodiment of the aluminophosphate-metal oxide bonded body of the present invention includes a step of allowing a seed crystal to adhere and a synthesis step. Furthermore, an alkali metal, an alkaline earth metal or both of these is disposed on a bonding surface of a metal oxide. Furthermore, the content rate of the alkali metal, alkaline earth metal or both of these is from 0.3 to 30.0% by mass with respect to all of the substances that are disposed on the bonding surface of the metal oxide. The step of allowing a seed crystal to adhere is a step in which a seeding slurry containing aluminophosphate seed crystals is applied to the bonding surface, which is a part of the surface of the metal oxide. The synthesis step is a step of obtaining an aluminophosphate-metal oxide bonded body by the following method. Firstly, the metal oxide to which the seeding slurry has been applied is immersed in a raw material solution for membrane formation containing an aluminum source raw material, a structure directing agent and phosphorus acid. Furthermore, the metal oxide is subjected to hydrothermal synthesis to dispose aluminophosphate on the bonding surface of the metal oxide to thereby give an aluminophosphate-metal oxide bonded body.

Therefore, according to the method for producing an aluminophosphate-metal oxide bonded body of this exemplary embodiment, only a predetermined amount of "the alkali metal, alkaline earth metal or both of these" (hereinafter sometimes referred to as "a bonding-promoting substance") is disposed on the bonding surface of the metal oxide. Therefore, the raw materials for membrane formation (the aluminum source raw material, phosphorus acid and the like) in the raw material solution for membrane formation are drawn by the bonding-promoting substance and gathered on the bonding surface of the metal oxide, and aluminophosphate is formed on this bonding surface. Accordingly, since the raw materials for membrane formation are drawn by the bonding-promoting substance and gathered on the bonding surface of the metal oxide, the aluminophosphate is bonded in a favorable bonded state to the bonding surface of the metal oxide. Further specifically, phosphate ion, which is negative ion, is drawn by the bonding-promoting substance disposed on the bonding surface of the metal oxide. Furthermore, aluminum ion, which is positive ion, is drawn by the phosphate ion that has been drawn by the bonding surface, whereby aluminophosphate is formed on this bonding surface. Accordingly, since the raw materials for membrane formation are drawn by the bonding-promoting substance and gathered on the bonding surface of the metal oxide, the aluminophosphate can be bonded to even an inner wall surface of a thin and long through hole of a structure having a complicated shape such as a monolithic shape, in a favorable bonded state. Meanwhile, in the metal oxide, the surface that is bonded to the aluminophosphate is referred to as a bonding surface, and a surface that is to be bonded to the aluminophosphate (a surface that is expected to be bonded) is also referred to as a bonding surface.

The method for producing an aluminophosphate-metal oxide bonded body of this exemplary embodiment will be explained below for each step.

(2-1) Step for allowing seed crystals to adhere;

The step for allowing seed crystals to adhere is a step for applying a seeding slurry containing an aluminophosphate seed crystals onto a bonding surface, which is a part of a metal oxide.

The method for preparing the seed crystals is not especially limited, and for example, it is preferable to prepare seed crystals of aluminophosphate based on the method described in a document (Applied Surface Science Vol. 226 p. 1-6). Specifically, it is preferable to firstly prepare a raw material solution by putting an aluminum source raw material, a structure directing agent, phosphorus acid, water and the like into a sealable container. The aluminum source raw material is a compound that serves as a raw material for feeding aluminum to be contained in the aluminophosphate. As the aluminum source raw material, aluminum triisopropoxide, aluminum sulfate, aluminum hydroxide, sodium aluminate and the like can be exemplified. Among these, aluminum triisopropoxide is preferable. As the structure directing agent, tetraethylammonium hydroxide, N,N-diisopropylethylenediamine and the like can be exemplified. Among these, tetraethylammonium hydroxide is preferable.

The content of the aluminum in the aluminum source raw material in the raw material solution is preferably from 30 to 150 mol with respect to 100 mol of the phosphorus acid. The content of the structure directing agent in the raw material solution is preferably from 50 to 100 mol with respect to 100 mol of the phosphorus acid. The content of the water in the raw material solution is preferably from 5,000 to 12,000 mol with respect to 100 mol of the phosphorus acid.

Secondly, it is preferable to conduct hydrothermal synthesis by heating at from 130 to 180° C. for 10 to 40 hours in the state that the raw material solution is allowed to stand still. Furthermore, it is preferable to dry the solution obtained by the hydrothermal synthesis to obtain microcrystals (seed crystals) of aluminophosphate.

It is preferable to disperse the obtained aluminophosphate seed crystals in a dispersing medium to prepare a seeding slurry. As the dispersing medium, water, ethanol or a mixture thereof is preferable. The concentration of the aluminophosphate seed crystals in the seeding slurry is preferably from 0.01 to 1.00% by mass. It is preferable that the aluminophosphate seed crystals contain a structure directing agent.

The average particle diameter of the aluminophosphate seed crystals is preferably from 80 to 500 nm, further preferably from 80 to 400 nm, and especially preferably from 80 to 300 nm. If the average particle diameter is smaller than 80 nm, the seed crystals may aggregate. If the average particle diameter is larger than 500 nm, the aluminophosphate layer may be thick. The average particle diameter is a D50 value (median diameter) (volume distribution) measured by a laser diffraction process.

Secondly, it is preferable to apply the seeding slurry containing the aluminophosphate seed crystals to a bonding surface, which is a part of the surface of the metal oxide. It is preferable that the metal oxide is porous. It is preferable that the metal oxide contains at least one kind selected from the group consisting of alumina, titania and silica by 70% by mass or more in total. Furthermore, the metal oxide contains at least one kind selected from the group consisting of alumina, titania and silica, further preferably by 80% by mass or more in total, and especially preferably by 90% by mass or more in total. Furthermore, the metal oxide may contain "an alkali metal, an alkaline earth metal or both of these" in the entirety of the metal oxide. Furthermore, the metal oxide may contain "the alkali metal, alkaline earth metal or both of these" in the surface layer having the bonding surface. Furthermore, the above-mentioned "surface layer having the bonding surface 5" may be a layer that is bound to the metal oxide by firing, or may be a layer that adheres to the surface of the metal oxide. The porosity and average pore diameter of the metal oxide can be suitably determined according to the intended use.

It is preferable the metal oxide is porous, and the open end diameter of each pore that opens on the bonding surface of the metal oxide is preferably from 0.3 to 1.5-times, further preferably from 0.4 to 1.3-times, and especially preferably from 0.6 to 1.2-times of the average particle diameter of the aluminophosphate seed crystal. If the open end diameter is smaller than 0.3-times, the aluminophosphate may be difficult to adhere homogeneously. If the open end diameter is larger than 1.5-times, the aluminophosphate may penetrate into the inner part of the metal oxide, and thus the aluminophosphate may generate in a place other than the bonding surface and may cause inhibition of permeation.

The metal oxide is not especially limited, and is preferably a structural body having a monolithic shape. In the case when the metal oxide is a structural body having a monolithic shape, it is preferable to set the inner wall surface of the through hole as a bonding surface. In other words, it is preferable to apply the seeding slurry to the inner wall surface of the through hole of the structural body (metal oxide) having a monolithic shape. In this case, it is necessary to use a structural body having a monolithic shape, in which "the bonding-promoting substance" is disposed on the inner wall surface (bonding surface) of the through hole. The structural body (metal oxide) having a monolithic shape may be such that "the bonding-promoting substance" is dispersed in the entirety of the structural body. Furthermore, the structural body (metal oxide) having a monolithic shape may be such that "the surface layer of which surface is a bonding surface" contains "the bonding-promoting substance" (the parts other than the surface layer may contain or not contain "the bonding-promoting substance"). Furthermore, "the surface layer of which surface is a bonding surface" mentioned above may be a layer that is bound to the metal oxide by firing, or may be a layer that adheres to the surface of the metal oxide. "The layer that has adhered to the surface of the metal oxide" refers to a layer that is obtained by only applying the raw material slurry to the surface of the metal oxide and drying the raw material slurry without bonding by sintering on the surface of the metal oxide.

The method for producing the structural body (metal oxide) having a monolithic shape is not especially limited, and a known method can be used. For example, the following method can be exemplified. A molding raw material containing a predetermined ceramic raw material is kneaded and then extruded by using a die such that a formed body having a monolithic shape is formed, thereby a formed body having a monolithic shape is obtained. The formed body is then dried and calcined, whereby a structural body (metal oxide) having a monolithic shape is obtained. Furthermore, the inner wall of each through hole may be formed by plural layers by further applying a ceramic raw material to the through hole of the formed body obtained by extrusion, and firing the ceramic raw material. Furthermore, the layer that is exposed on the surface in these plural layers may be set as a surface layer containing "the bonding-promoting substance" mentioned above. Furthermore, the structural body (metal oxide) having a monolithic shape may have "a membrane-like layer having not been sintered" on the inner wall surface of the through hole. For example, as "the membrane-like layer having not been sintered", a layer of sodium hydroxide or the like can be exemplified. In this case, the sodium in the sodium hydroxide serves as "the bonding-promoting substance".

The content rate of "the bonding-promoting substance" is from 0.3 to 30.0% by mass, further preferably from 0.5 to 20% by mass, and especially preferably from 2 to 10% by mass, with respect to all of the substances disposed on the bonding surface of the metal oxide. If the content rate is smaller than 0.3% by mass, it may be difficult to make the bonded state between the aluminophosphate and metal oxide favorable. If the content rate is larger than 30.0% by mass, the bonding strength may decrease.

In applying the seeding slurry to the inner wall surface of the through hole of the structural body (metal oxide) having a monolithic shape, it is preferable that the seeding slurry is poured into the through hole, and applying the seeding slurry to the inner wall surface of the through hole in a membrane shape. Furthermore, it is preferable to dry the seeding slurry in a membrane shape after the application. The operation to apply the seeding slurry to the inner wall surface of the through hole in a membrane shape and dry the seeding slurry is conducted preferably 1 to 3 times, further preferably 1 or 2 times.

The other respective conditions about the metal oxide are preferably the above-mentioned conditions that are deemed to be preferable in the aluminophosphate-metal oxide bonded body of the present invention.

(2-2) Synthesis Step;

The synthesis step is a step of obtaining an aluminophosphate-metal oxide bonded body by the following method. Firstly, the metal oxide on which the seeding slurry has been applied is immersed in a raw material solution for membrane formation containing an aluminum source raw material, a structure directing agent and phosphorus acid. Furthermore, hydrothermal synthesis is conducted to dispose aluminophosphate on the bonding surface of the metal oxide to give an aluminophosphate-metal oxide bonded body.

It is preferable that the raw material solution for membrane formation is prepared by putting an aluminum source raw material, a structure directing agent, phosphorus acid, water and the like into a sealable container. As the aluminum source raw material, aluminum triisopropoxide, aluminum sulfate, aluminum hydroxide, sodium aluminate and the like can be exemplified. Among these, aluminum triisopropoxide is preferable. As the structure directing agent, tetraethylammonium hydroxide, N,N-diisopropylethylenediamine and the like can be exemplified. Among these, tetraethylammonium hydroxide is preferable.

The content of the aluminum source raw material in the raw material solution is preferably from 30 to 150 mol with respect to 100 mol of the phosphorus acid. The content of the structure directing agent in the raw material solution is preferably from 50 to 150 mol with respect to 100 mol of the phosphorus acid. The content of the water in the raw material solution is preferably from 12,000 to 50,000 mol with respect to 100 mol of the phosphorus acid.

Next, the metal oxide on which the seeding slurry has been applied is immersed in a raw material solution for membrane formation.

Next, aluminophosphate is disposed on the bonding surface of the metal oxide by hydrothermal synthesis to give an aluminophosphate-metal oxide bonded body. Specifically, it is preferable to conduct the hydrothermal synthesis by heating at from 130 to 170° C. for from 10 to 50 hours in the state that the raw material solution for membrane formation is allowed to stand still. An aluminophosphate-metal oxide bonded body can be obtained by disposing aluminophosphate on the bonding surface of the metal oxide by this way.

Thereafter, it is preferable to remove the structure directing agent contained in the aluminophosphate membrane by combustion. In the removing by combustion, it is preferable to conduct heating at 350 to 420° C. for 10 to 100 hours.

The above-mentioned method is a method for preparing a bonded body by bonding an aluminophosphate membrane to a structure by growing a membrane on the surface of the structure.

EXAMPLES

The present invention will be explained below in more detail by Examples, but the present invention is not limited by these Examples.

Example 1

(1) Preparation of Aluminophosphate ($AlPO_4$-18) Seed Crystals 6.15 g of aluminum triisopropoxide (manufactured by Kanto Chemical Co., Inc.) was put into a 100 ml sealable container made of a fluorine resin, 40.07 g of 35% tetraethylammonium hydroxide (manufactured by Sigma Aldrich) was added thereto, and stirring was conducted. By this way, the aluminum triisopropoxide was completely dissolved in the tetraethylammonium hydroxide. 20 g of pure water was added thereto, and stirring is further conducted. Thereafter, 10.98 g of 85% phosphorus acid (manufactured by Sigma Aldrich) was slowly added dropwise by means of a dropper. After the dropwise addition, the dropper was washed with 2.80 g of pure water, and the liquid after the washing was added to the sealable container. The stirring is then continued for about 120 minutes to give a transparent raw material solution. The tetraethylammonium hydroxide is a structure directing agent.

Next, aluminophosphate ($AlPO_4$-18) crystals (seed crystals) were synthesized. Specifically, 80 g of a raw material solution was put into a pressure resistance container made of stainless equipped with an inner cylinder made of a fluorine resin with an inner volume of 100 ml. The raw material solution in the container was then heated at 150° C. for 20 hours in the state that the raw material solution was allowed to stand still (hydrothermal synthesis was conducted). After the hydrothermal synthesis, the solution in which the aluminophosphate ($AlPO_4$-18) crystals had been dispersed was collected, and washed by repeating operations of adding pure water and conducting centrifugation twice. A part of the solution was dried overnight at 80° C. to give a dry powder (an aluminophosphate ($AlPO_4$-18) seed crystal). The crystal phase of the obtained powder was confirmed to be $AlPO_4$-18 by an XRD measurement (powder X-ray diffractometry).

(2) Preparation of Porous Metal Oxide having Monolithic Shape

A porous metal oxide having a monolithic shape was obtained by pouring a slurry containing alumina and magnesium chloride into through holes of an alumina-titania composite material having a monolithic shape (without a surface layer), filtering the slurry by partition walls to thereby allow a solid content to adhere to the inner wall surfaces, and firing the solid content. The fired surface of "the solid content adhered to the inner wall surfaces" mentioned above becomes "a surface layer". The solid content contained alumina in which magnesium element had been solidified as a main component.

The porous metal oxide having a monolithic shape had 30 through holes. The open end diameter of each through hole was 2.34 mm. The length of the porous metal oxide having a monolithic shape in the direction to which the through holes extended was 160 mm. The metal oxide that constituted the porous metal oxide was specifically an alumina-titania composite material, and the mixing ratio of the alumina ($Al_2O_3$) to titania ($TiO_2$) was about 60:1 (alumina: titania). As the porous metal oxide having a monolithic shape, a porous metal oxide in which alumina containing 10% by mass of magnesium (a bonding-promoting substance) was contained in the inner wall surfaces (bonding surfaces) of the through holes was used. The porous metal oxide having a monolithic shape was such that each of the through holes had "a surface layer" containing 10% by mass of magnesium.

(3) Application of Seed Crystal Slurry

A seeding slurry (a seed crystal slurry) was prepared by dispersing the aluminophosphate seed crystals in water (a dispersing medium for the seeding slurry). The concentration of the aluminophosphate seed crystals was set to 0.1% by mass.

The seeding slurry was poured into the through holes (cells) of the porous metal oxide having a monolithic shape to coat the inner wall surfaces of the through holes with the seeding slurry. Thereafter, air at room temperature was flown into the through holes under a condition of a wind velocity of from 2 to 7 m/sec for 30 minutes, whereby the seeding slurry applied to the wall surfaces in the through holes was dried. The above-mentioned operations were repeated twice in total, whereby a porous metal oxide in which the aluminophosphate seed crystals had adhered to the inner wall surfaces of the through holes was obtained.

(4) Preparation of Raw Material Solution for Membrane Formation

Next, after 4.72 g of aluminum triisopropoxide (manufactured by Kanto Chemical Co., Inc.) was put into a container made of a fluorine resin, 30.71 g of 35% tetraethylammonium hydroxide (manufactured by Sigma Aldrich) was added, and stirring was conducted. By this way, the aluminum triisopropoxide was completely dissolved in the tetraethylammonium hydroxide. 43 g of pure water was added thereto, and stirring was further conducted. Thereafter "a liquid obtained by diluting 8.41 g of 85% phosphorus acid (manufactured by Sigma Aldrich) with 12 g of pure water" was slowly added by dropwise addition by using a dropper. Thereafter the dropper was washed with 101.17 g of pure water, and the liquid after the washing was added. Thereafter stirring was continued for about 120 minutes, whereby a transparent raw material solution for membrane formation was prepared.

(5) Hydrothermal Synthesis

The porous metal oxide to which the seed crystal had adhered was disposed in a pressure resistance container made of stainless having a volume of 300 cm$^3$ equipped with an inner cylinder made of a fluorine resin, the raw material solution for membrane formation was put into the container, and a heating treatment (hydrothermal synthesis) was conducted at 150° C. (synthesis temperature) for 30 hours (synthesis time). By this way, an aluminophosphate (AlPO$_4$-18) membrane was bonded to the wall surface of the through hole of the porous metal oxide. Thereafter the porous metal oxide to which the aluminophosphate (AlPO$_4$-18) membrane had been bonded was taken out, and washed with water for 48 hours. "The porous metal oxide to which the aluminophosphate (AlPO$_4$-18) membrane had been bonded" was subjected to "(6) Test for confirming bonded state" after the water washing, and then subjected to "(7) Heating treatment" after "(6) Test for confirming bonded state".

(6) Test for Confirming Bonded State

"The porous metal oxide to which the aluminophosphate (AlPO$_4$-18) membrane had been bonded", after the washing with water, was subjected to "a test for confirming a bonded state" by the following method. The result is shown in Table 1. The amount of the N$_2$ that had permeated the aluminophosphate (AlPO$_4$-18) membrane was equal to or less than the measurement lower limit value of the measurement apparatus. In measuring the amount of N$_2$, the inside of each through hole was pressurized to about 200 kPa by N$_2$, and the flow amount of the N$_2$ that had permeated the aluminophosphate membrane in this state was measured by a soap membrane flow amount meter. The measurement limit was $10^{-5}$ (L/(min·m$^2$·kPa)).

(7) Heating Treatment

A heating treatment was conducted, at 400° C. for 10 hours, on "the porous metal oxide to which the aluminophosphate (AlPO$_4$-18) membrane had been bonded", after the washing with water. By this heating treatment, the tetraethylammonium hydroxide contained in the aluminophosphate (AlPO$_4$-18) membrane was removed by combustion, whereby an aluminophosphate-metal oxide bonded body was obtained.

(8) Permeation Test

"A permeation test" was conducted on the obtained aluminophosphate-metal oxide bonded body by the following method. In "the permeation test", water was used as a first substance, and ethanol was used as a second substance. Furthermore, the first substance/the second substance (molar ratio) was 50/50. Furthermore, the pressure (predetermined pressure) at the secondary side was set to 50 torr, and the predetermined temperature was set to 70° C. The result was such that only water was permeated, and the amount of the permeated water was 1 kg/h·m$^2$.

(Test for Confirming Bonded State)

The inside of the through holes of the aluminophosphate-metal oxide bonded body is pressurized at 200 kPa by using N$_2$, and the amount of the N$_2$ that has permeated to the secondary side (the inside of the metal oxide bonded body) is confirmed. Furthermore, the ratio of the surface area of the unbonded part to the entirety of the bonding surface (the ratio of the unbonded part) of the aluminophosphate membrane is calculated from the amount of the permeated N$_2$. Since N$_2$ does not permeate the aluminophosphate membrane containing the structure directing agent, the N$_2$ that has permeated after formation of the membrane is the N$_2$ that has permeated through the unbonded part. The ratio of the unbonded part is deemed as the ratio of "the amount of the N$_2$ that has permeated to the secondary side (the inner part side of the metal oxide bonded body)" after the formation of the aluminophosphate membrane to the flow amount of the N$_2$ that permeates the metal oxide before the formation of the aluminophosphate membrane. A smaller ratio of the unbonded part indicates a more favorable bonded state.

(Permeation Test)

A mixture of the first substance and the second substance is passed through the through holes of the aluminophosphate-metal oxide bonded body at a predetermined temperature while the pressure of the secondary side of the aluminophosphate membrane (the inner part side of the aluminophosphate-metal oxide bonded body) is reduced at a predetermined pressure. Furthermore, the substances that have permeated to the secondary side are confirmed, and the separation state (separation performance) is evaluated.

TABLE 1

| | Dispersion medium of seeding slurry | Conditions for hydrothermal synthesis | | Bonding-promoting substance | | Rate of unbonded portion |
| --- | --- | --- | --- | --- | --- | --- |
| | | Temperature (° C.) | Time (hours) | Kind | Content rate (% by mass) | (surface area %) |
| Example 1 | Water | 150 | 30 | Magnesium | 10 | less than $10^{-5}$ |
| Example 2 | Water | 150 | 27 | Magnesium | 10 | less than $10^{-5}$ |
| Example 3 | Ethanol | 150 | 30 | Magnesium | 10 | less than $10^{-5}$ |
| Example 4 | Ethanol | 150 | 20 | Magnesium | 10 | less than $10^{-5}$ |
| Example 5 | Water | 138 | 30 | Sodium | 0.36 | 0.413 |
| Comparative Example 1 | Water | 150 | 20 | — | 0 | 83 |
| Comparative Example 2 | Water | 138 | 35 | — | 0 | 87 |

Example 2

(1) Preparation of Aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

A porous metal oxide having a monolithic shape was obtained in a similar manner to that in Example 1.

(3) Application of Seed Crystal Slurry

A porous metal oxide in which the aluminophosphate seed crystals had adhered to the inner walls of the through holes was obtained in a similar manner to that in Example 1.

(4) Preparation of Raw Material Solution for Membrane Formation

A raw material solution for membrane formation was prepared in a similar manner to that in Example 1.

(5) Hydrothermal Synthesis

"A porous metal oxide to which the aluminophosphate membrane had been bonded, after the washing with water" was obtained in a similar manner to that in Example 1, except that the time for the hydrothermal synthesis (formation of an aluminophosphate membrane) was set to 27 hours.

(6) Test for Confirming Bonded State

"A test for confirming a bonded state" was conducted in a similar manner to that in Example 1 on "the porous metal oxide to which the aluminophosphate ($AlPO_4$-18) membrane had been bonded", after the washing with water. The result is shown in Table 1. In addition, the amount of the $N_2$ that had permeated the aluminophosphate ($AlPO_4$-18) membrane was equal to or less than the measurement lower limit value of the measurement apparatus.

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

(8) Permeation Test

"A permeation test" was conducted on the obtained aluminophosphate-metal oxide bonded body by the above-mentioned method. In "the permeation test", carbon dioxide was used as the first substance, and methane was used as the second substance. Furthermore, the first substance/the second substance (molar ratio) was 50/50. Furthermore, the pressure of the secondary side (predetermined pressure) was set to 50 torr, and the predetermined temperature was set to 70° C. The result was such that the carbon dioxide flux was 147 (liter/(min·m$^2$)) and α was 43. "α" used herein is a separation coefficient. For example, in the case when two components A and B are present, when the concentrations of the components A and B at the feeding side and permeation side are set as "$X_A$ and $X_B$ (feeding side)" and "$Y_A$ and $Y_B$ (permeation side)", "α" is represented by the formula "$\alpha = (Y_A/Y_B)/(X_A/X_B)$".

Example 3

(1) Preparation of Aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

A porous metal oxide having a monolithic shape was obtained in a similar manner to that in Example 1.

(3) Application of Seed Crystal Slurry

An aluminophosphate seeding slurry was prepared by dispersing the aluminophosphate ($AlPO_4$-18) seed crystals in ethanol. The concentration of the seed crystal was 0.23% by mass. A porous metal oxide to which the aluminophosphate ($AlPO_4$-18) seed crystals had adhered was obtained by conducting similar operations to that in Example 1.

(4) Preparation of Raw Material Solution for Membrane Formation

A raw material solution for membrane formation was prepared in a similar manner to that in Example 1.

(5) Hydrothermal Synthesis

Next, the porous metal oxide to which the seed crystal had adhered was disposed in a similar manner to that in Example 1 in a pressure resistance container made of stainless having a volume of 300 cm$^3$ and equipped with an inner cylinder made of a fluorine resin, and a raw material solution for membrane formation having the same composition as in Example 1 was put therein. Furthermore, a heating treatment (hydrothermal synthesis) was conducted at 150° C. (synthesis temperature) for 30 hours (synthesis time). By this way, an aluminophosphate ($AlPO_4$-18) membrane was bonded to the wall surfaces in the through holes (cells) of the porous metal oxide. Thereafter the porous metal oxide to which the aluminophosphate ($AlPO_4$-18) membrane had bonded was taken out and washed with water for 48 hours. By this way, "a porous metal oxide to which the aluminophosphate membrane had been bonded, after the washing with water" was obtained.

(6) Test for Confirming Bonded State

"A test for confirming a bonded state" was conducted in a similar manner to that in Example 1 on "the porous metal oxide to which the aluminophosphate membrane had been bonded", after the washing with water. The result is shown in Table 1. In addition, the amount of the $N_2$ that had permeated the aluminophosphate ($AlPO_4$-18) membrane was equal to or less than the measurement lower limit value of the measurement apparatus.

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

(8) Permeation Test

"A permeation test" was conducted on the obtained aluminophosphate-metal oxide bonded body by the above-mentioned method. In "the permeation test", water was used as the first substance, and acetic acid was used as the second substance. Furthermore, the first substance/the second substance (molar ratio) was 10/90. Furthermore, the pressure of the secondary side (predetermined pressure) was set to 50 torr, and the predetermined temperature was 90° C. The result was such that the water had mainly permeated to the permeation (secondary) side, the amount of the permeated water was 0.26 kg/(m²·h), and the concentration of the acetic acid in the permeation liquid was 0.027% by mass.

Example 4

(1) Preparation of aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

A porous metal oxide having a monolithic shape was obtained in a similar manner to that in Example 1.

(3) Application of Seed Crystal Slurry

A porous metal oxide to which the aluminophosphate ($AlPO_4$-18) seed crystals had adhered was obtained in a similar manner to Example 3.

(4) Preparation of Raw Material Solution for Membrane Formation

A raw material solution for membrane formation was prepared in a similar manner to that in Example 1.

(5) Hydrothermal Synthesis

"A porous metal oxide to which the aluminophosphate ($AlPO_4$-18) membrane had been bonded, after the washing with water", was obtained in a similar manner to Example 3, except that the time for the hydrothermal synthesis (formation of an aluminophosphate membrane) was set to 20 hours.

(6) Test for Confirming Bonded State

"A test for confirming a bonded state" was conducted in a similar manner to that in Example 1 on "the porous metal oxide to which the aluminophosphate membrane had been bonded, after the washing with water". The result is shown in Table 1. In addition, the amount of the $N_2$ that had permeated the aluminophosphate ($AlPO_4$-18) membrane was equal to or less than the measurement lower limit value of the measurement apparatus.

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

(8) Permeation Test

"A permeation test" was conducted by the above-mentioned method on the obtained aluminophosphate-metal oxide bonded body. In "the permeation test", carbon dioxide was used as the first substance, and methane was used as the second substance. Furthermore, the first substance/the second substance (molar ratio) was 50/50. Furthermore, the pressure of the secondary side (predetermined pressure) was set to 50 torr, and the predetermined temperature was set to 70° C. The result was such that the carbon dioxide flux was 197 (liter/(min·m²)) and a was 44.

Example 5

(1) Preparation of Aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

A porous metal oxide having a monolithic shape was prepared by the following method. Firstly, about 0.25 mol/liter of an aqueous sodium hydroxide solution was poured into the through holes of the alumina-silica composite material having a monolithic shape (without a surface layer). Furthermore, drying was conducted by flowing air at room temperature into the through holes for 30 minutes, and the alumina-silica composite material was allowed to stand overnight in a drier at 80° C. to dispose sodium on the inner wall surfaces of the through holes, whereby a porous metal oxide having a monolithic shape was formed. The inner wall surface (bonding surface) of each through hole of the porous metal oxide having a monolithic shape was such that 0.36% by mass of sodium was contained in alumina-silica. The metal oxide that constituted the porous metal oxide was specifically an alumina-silica composite material, and the mixing ratio of the alumina ($Al_2O_3$) and silica ($SiO_2$) was about 500:1 (alumina:silica).

The porous metal oxide having a monolithic shape had 61 through holes. The open end diameter of each through hole was 2.14 mm. The length of the porous metal oxide having a monolithic shape in the direction to which the through holes extended was 140 mm.

(3) Application of Seed Crystal Slurry

A porous metal oxide to which the aluminophosphate ($AlPO_4$-18) seed crystals had adhered was obtained in a similar manner to Example 1.

(4) Preparation of Raw Material Solution for Membrane Formation

A raw material solution for membrane formation was prepared in a similar manner to that in Example 1.

(5) Hydrothermal Synthesis

"A porous metal oxide to which the aluminophosphate membrane had been bonded, after the washing with water", was obtained in a similar manner to Example 1, except that the conditions for the hydrothermal synthesis were 138° C. and 30 hours.

(6) Test for Confirming Bonded State

"A test for confirming a bonded state" was conducted in a similar manner to that in Example 1 on "the porous metal oxide to which the aluminophosphate membrane had been bonded", after the washing with water. The result is shown in Table 1. In addition, the amount of the $N_2$ that had permeated to the secondary side (the inner part side of the metal oxide bonded body) was 0.413 (liter/(min·m²·kPa)).

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

Comparative Example 1

(1) Preparation of Aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

As a porous metal oxide having a monolithic shape, a porous metal oxide having a monolithic shape in which "a bonding-promoting substance" such as magnesium was not disposed on the inner wall surfaces (bonding surfaces) of the through holes was used. The metal oxide that constituted the porous metal oxide was specifically alumina. The porous metal oxide having a monolithic shape had 61 through holes. The through holes each had an open end diameter of 2.34 mm. The length of the porous metal oxide having a monolithic shape in the direction to which the through holes extended was 160 mm.

(3) Application of Seed Crystal Slurry

A seeding slurry was prepared by dispersing aluminophosphate seed crystals in water. The concentration of the aluminophosphate seed crystals was set to 0.06% by mass. The seeding slurry was poured into the through hole (cells) of the porous metal oxide having a monolithic shape to coat the inner wall surfaces of the through holes with the seeding slurry. Thereafter, the seeding slurry coated on the wall surfaces in the through holes was dried by flowing air at room temperature into the through holes for 30 minutes under a condition of a wind velocity of from 2 to 7 m/sec. The above-mentioned operations were repeated twice in total, whereby a porous metal oxide to which the aluminophosphate seed crystals had adhered was obtained.

(4) Preparation of Raw Material Solution for Membrane Formation

Next, 5.67 g of aluminum triisopropoxide (manufactured by Kanto Chemical Co., Inc.) was put into a container made of a fluorine resin, 37.03 g of 35% tetraethylammonium hydroxide (manufactured by Sigma Aldrich) was added thereto, and stirring was conducted. By this way, the aluminum triisopropoxide was completely dissolved in the tetraethylammonium hydroxide. 50 g of pure water was added thereto, and stirring was further conducted. Thereafter "a liquid obtained by diluting 10.15 g of 85% phosphorus acid (manufactured by Sigma Aldrich) with 17 g of pure water" was slowly added by dropwise addition by using a dropper. Thereafter the dropper was washed with 80.14 g of pure water, and the liquid after the washing was added. Thereafter the stirring was continued for about 120 minutes, whereby a transparent raw material solution for membrane formation was prepared.

(5) Hydrothermal Synthesis

The porous metal oxide to which the seed crystals had adhered was disposed in a pressure resistance container made of stainless having a volume of 300 $cm^3$ equipped with an inner cylinder made of a fluorine resin, the raw material solution for membrane formation was put into the container, and a heating treatment (hydrothermal synthesis) was conducted at 150° C. (synthesis temperature) for 20 hours (synthesis time). By this way, an aluminophosphate ($AlPO_4$-18) membrane was bonded to the wall surface in each through hole of the porous metal oxide. Thereafter the porous metal oxide to which the aluminophosphate ($AlPO_4$-18) membrane had been bonded was taken out and washed with water for 24 hours, whereby "a porous metal oxide to which the aluminophosphate membrane had been bonded, after the washing with water" was obtained.

(6) Test for Confirming Bonded State

"The porous metal oxide to which the aluminophosphate membrane had been bonded", after the washing with water, was subjected to "a test for confirming a bonded state" in a similar manner to that in Example 1. The result is shown in Table 1. The amount of the $N_2$ that had permeated to the secondary side (the inner part side of the metal oxide bonded body) was 16.18 (liter/(min·$m^2$·kPa)). Since the flow amount of the $N_2$ that had permeated the metal oxide before forming aluminophosphate was 19.54 (liter/(min·$m^2$·kPa)), it is deemed that about 83% of the entirety of the $N_2$ flow amount had gone to the secondary side (the inner part side of the metal oxide bonded body). Therefore, it is understood that the surface area of the unbonded part was about 83% of the entirety of the bonding surface.

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

Comparative Example 2

(1) Preparation of Aluminophosphate ($AlPO_4$-18) Seed Crystals

Aluminophosphate ($AlPO_4$-18) seed crystals were prepared in a similar manner to that in Example 1.

(2) Preparation of Porous Metal Oxide having Monolithic Shape

As a porous metal oxide having a monolithic shape, a porous metal oxide having a monolithic shape in which "a bonding-promoting substance" such as magnesium was not disposed on the inner wall surfaces (bonding surfaces) of the through holes was used. The metal oxide that constituted the porous metal oxide was specifically alumina. The porous metal oxide having a monolithic shape had 61 through holes. The through holes each had an open end diameter of 2.14 mm. The length of the porous metal oxide having a monolithic shape in the direction to which the through holes extended was 160 mm.

(3) Application of Seed Crystal Slurry

A seeding slurry was prepared by dispersing the aluminophosphate seed crystals in water. The concentration of the aluminophosphate seed crystals was set to 0.1% by mass. The seeding slurry was poured into the through holes (cells) of the porous metal oxide having a monolithic shape to coat the inner wall surfaces of the through holes with the seeding slurry. Thereafter, air at room temperature was flown into the through holes under a condition of a wind velocity of from 2 to 7 m/sec for 30 minutes, whereby the seeding slurry applied to the wall surfaces in the through holes was dried. The above-mentioned operations were repeated twice in total, whereby a porous metal oxide in which the aluminophosphate seed crystals had adhered was obtained.

(4) Preparation of Raw Material Solution for Membrane Formation

Next, 5.68 g of aluminum triisopropoxide (manufactured by Kanto Chemical Co., Inc.) was put into a container made of a fluorine resin, 37.03 g of 35% tetraethylammonium hydroxide (manufactured by Sigma Aldrich) was added, and stirring was conducted. By this way, the aluminum triisopropoxide was completely dissolved in the tetraethylammonium hydroxide. 50 g of pure water was added thereto, and stirring was further conducted. Thereafter "a liquid obtained by diluting 10.15 g of 85% phosphorus acid (manufactured by Sigma Aldrich) with 17 g of pure water" was slowly added by dropwise addition by using a dropper. Thereafter the dropper was washed with 80.14 g of pure water, and the liquid after the washing was added. Thereafter the stirring was continued for about 120 minutes, whereby a transparent raw material solution for membrane formation was prepared.

(5) Hydrothermal Synthesis

The porous metal oxide to which the seed crystals had adhered was disposed in a pressure resistance container made of stainless having a volume of 300 cm$^3$ equipped with an inner cylinder made of a fluorine resin, the raw material solution for membrane formation was put into the container, and a heating treatment (hydrothermal synthesis) was conducted at 138° C. (synthesis temperature) for 35 hours (synthesis time). By this way, an aluminophosphate (AlPO$_4$-18) membrane was bonded to the wall surface in each through hole of the porous metal oxide. Thereafter the porous metal oxide to which the aluminophosphate (AlPO$_4$-18) membrane had been bonded was taken out, and washed with water for 48 hours to give "a porous metal oxide to which the aluminophosphate membrane had been bonded, after the washing with water".

(6) Test for Confirming Bonded State

"A test for confirming a bonded state" was conducted in a similar manner to that in Example 1 on "the porous metal oxide to which the aluminophosphate membrane had been bonded", after the washing with water. The result is shown in Table 1. The amount of the N$_2$ that had permeated to the secondary side (the inner part side of the metal oxide bonded body) was 21.00 (liter/(min·m$^2$·kPa)). Since the flow amount of the N$_2$ that had permeated the metal oxide before forming aluminophosphate was 24.00 (liter/(min·m$^2$·kPa)), it is deemed that about 87% of the entirety of the N$_2$ flow amount had gone to the secondary side (the inner part side of the metal oxide bonded body). Therefore, it is understood that the surface area of the unbonded part was about 87% of the entirety of the bonding surface.

(7) Heating Treatment

A heating treatment was conducted in a similar manner to that in Example 1 on "the porous metal oxide to which the aluminophosphate membrane had been bonded, after the washing with water", whereby an aluminophosphate-metal oxide bonded body was obtained.

It is understood from above that the aluminophosphate-metal oxide bonded bodies each having a bonding surface on which "a bonding-promoting substance" such as magnesium had been disposed (Examples 1 to 5) had both a favorable separation performance and a favorable bonded state. Furthermore, it is also understood that the aluminophosphate-metal oxide bonded bodies each having a bonding surface to which "a bonding-promoting substance" such as magnesium had not been disposed (Comparative Examples 1 and 2) had a bad bonded state. Furthermore, if the bonded state is bad, then the separation performance naturally decreases.

INDUSTRIAL APPLICABILITY

The aluminophosphate-metal oxide bonded body of the present invention can be preferably used for a separation membrane, a refrigerant adsorption carrier for heat pumps, and the like. Furthermore, the method for producing an aluminophosphate-metal oxide bonded body of the present invention can be preferably used for the production of such aluminophosphate-metal oxide bonded body of the present invention.

DESCRIPTION OF REFERENCE NUMERALS

1: partition wall, 2: through hole, 3: metal oxide, 4: surface, 5: bonding surface, 6: aluminophosphate, 7: inner space, 8: open end, 9: circumferential wall, 11: one end face, 12: another end face, 100: aluminophosphate-metal oxide bonded body.

What is claimed is:

1. An aluminophosphate-metal oxide bonded body comprising a metal oxide having a bonding surface on a part of the surface thereof, and an aluminophosphate separation membrane bonded to the bonding surface of the metal oxide,
    wherein the metal oxide contains at least one material selected from the group consisting of alumina, titania and silica by 70% by mass or more in total,
    the metal oxide contains an alkali metal, an alkaline earth metal or both of these throughout the metal oxide, or a surface layer of the metal oxide whose surface is the bonding surface contains an alkali metal, an alkaline earth metal or both of these, and
    in a portion of the metal oxide from the bonding surface to a depth of 1 μm, a content rate of the alkali metal, alkaline earth metal or both is from 0.3% to 30.0% by mass with respect to all substances that are present in the portion of the metal oxide.

2. The aluminophosphate-metal oxide bonded body according to claim 1, wherein the alkali metal is sodium, and the alkaline earth metal is calcium, magnesium or both of these.

3. The aluminophosphate-metal oxide bonded body according to claim 1, wherein the content rate of the alkali metal, alkaline earth metal or both of these is from 0.5% to 20.0% by mass with respect to all substances that are present in the portion of the metal oxide.

4. The aluminophosphate-metal oxide bonded body according to claim 1, wherein
    the metal oxide is a structural body having at least one inner space, and
    a value obtained by dividing the surface area of the bonding surface of the metal oxide by the space volume of the metal oxide is 100 or more.

5. The aluminophosphate-metal oxide bonded body according to claim 4, wherein
    the at least one inner space of the metal oxide is a space having at least one open end on the surface of the metal oxide,
    the length of the at least one inner space in the direction to which the at least one inner space extends is 100 mm or more, and
    the open end of the at least one inner space has a diameter of 5 mm or less.

6. The aluminophosphate-metal oxide bonded body according to claim 4, wherein
    the at least one inner space is a through hole having open ends on both end parts,
    the metal oxide has a monolithic shape having 10 or more of the through holes, and
    the through holes each has a cross-sectional surface having a diameter of 5 mm or less and being orthogonal to the direction to which the through holes extend.

7. The aluminophosphate-metal oxide bonded body according to claim 1, wherein the aluminophosphate separation membrane has, within a surface thereof that faces the surface of the metal oxide, a surface which is not bonded to the metal oxide and whose surface area ratio to the surface of the aluminophosphate separation membrane that faces the surface of the metal oxide is 1% or less.

8. The aluminophosphate-metal oxide bonded body according to claim 1, wherein the aluminophosphate separation membrane has a molecular structure being a structure having an oxygen 8-membered ring.

9. The aluminophosphate-metal oxide bonded body according to claim 1, wherein the aluminophosphate separation membrane has an AEI structure.

10. The aluminophosphate-metal oxide bonded body according to claim 1, wherein the crystal structure of the aluminophosphate separation membrane acts as a molecular sieve.

11. A method for producing the aluminophosphate-metal oxide bonded body, according to claim 1, comprising;
    a step of allowing seed crystals to adhere, wherein a seeding slurry containing aluminophosphate seed crystals is applied to a bonding surface, which is a part of a surface of a metal oxide, and
    a synthesis step, wherein the metal oxide on which the seeding slurry has been applied is immersed in a raw material solution for membrane formation containing an aluminum source raw material, a structure directing agent and phosphorus acid and subjected to hydrothermal synthesis, whereby an aluminophosphate separation membrane is bonded to the bonding surface of the metal oxide to give an aluminophosphate-metal oxide bonded body,
    wherein the metal oxide contains at least one material selected from the group consisting of alumina, titania and silica by 70% by mass or more in total,
    alkali metal, an alkaline earth metal or both of these is/are disposed on the bonding surface of the metal oxide, and
    the content rate of the alkali metal, alkaline earth metal or both of these is from 0.3% to 30.0% by mass with respect to all of the substances disposed on the bonding surface of the metal oxide.

12. The method for producing an aluminophosphate-metal oxide bonded body according to claim 11, wherein the liquid phase of the seeding slurry, in which the aluminophosphate seed crystals are dispersed, is water, ethanol or a mixture thereof.

13. The method for producing an aluminophosphate-metal oxide bonded body according to claim 11, wherein the concentration of the aluminophosphate seed crystals in the seeding slurry is from 0.01% to 1.00% by mass.

14. The method for producing an aluminophosphate-metal oxide bonded body according to claim 11, wherein the aluminophosphate seed crystals contain a structure directing agent.

15. The method for producing an aluminophosphate-metal oxide bonded body according to claim 11, wherein
    the aluminophosphate seed crystals have an average particle diameter of from 80 nm to 500 nm,
    the metal oxide is porous and has pores that are opened on the bonding surface of the metal oxide, wherein each pore has an open pore diameter of from 0.3 to 1.5-times of the average particle diameter of the aluminophosphate seed crystals.

16. The method for producing an aluminophosphate-metal oxide bonded body according to claim 11, wherein the temperature condition in the hydrothermal synthesis is from 130° C. to 170° C.

17. The method for producing an aluminophosphate-metal oxide bonded body according to claim 11, wherein the time for the hydrothermal synthesis is from 10 hours to 50 hours.

18. The method for producing an aluminophosphate-metal oxide bonded body according to claim 11, wherein the crystal structure of the aluminophosphate separation membrane acts as a molecular sieve.

* * * * *